US011710186B2

(12) United States Patent
Tyner et al.

(10) Patent No.: US 11,710,186 B2
(45) Date of Patent: Jul. 25, 2023

(54) DETERMINING GEOCODED REGION BASED RATING SYSTEMS FOR DECISIONING OUTPUTS

(71) Applicant: Allstate Insurance Company, Northbrook, IL (US)

(72) Inventors: Ralph Adam Benjamin Tyner, Gurnee, IL (US); Jonathan Fesenmeyer, Arlington Heights, IL (US); Lauren Ugulini, Ankeny, IA (US); John Lower, Elmhurst, IL (US); Analini Shetty, Long Grove, IL (US); Darius Tallat-Kelpsa, Naperville, IL (US); David Robert McNulty, Gurnee, IL (US); Michelle Ann Wagner, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 86 days.

(21) Appl. No.: 16/857,434

(22) Filed: Apr. 24, 2020

(65) Prior Publication Data

US 2021/0334905 A1 Oct. 28, 2021

(51) Int. Cl.
*G06Q 40/08* (2012.01)
*G06F 16/29* (2019.01)
*G06N 20/00* (2019.01)

(52) U.S. Cl.
CPC ........... *G06Q 40/08* (2013.01); *G06F 16/29* (2019.01); *G06N 20/00* (2019.01)

(58) Field of Classification Search
CPC ....................................................... G06Q 40/08
See application file for complete search history.

(56) References Cited

U.S. PATENT DOCUMENTS 6,725,201 B2   4/2004 Joao
7,343,306 B1   3/2008 Bates et al.
(Continued)

FOREIGN PATENT DOCUMENTS

WO   WO-2021133310 A1 * 7/2021 .......... G06K 9/00657

OTHER PUBLICATIONS

Caitlin Dempsey, What is a Shapefile?, Dec. 30, 2015. GIS Lounge, retrieved from https://www.gislounge.com/what-is-a-shapefile/ (Year: 2015).*

(Continued)

*Primary Examiner* — Gregory S Cunningham, II
(74) *Attorney, Agent, or Firm* — Polsinelli PC (57) ABSTRACT

Methods, computer-readable media, software, and apparatuses may determine, for a geographic region and based on geolocation data, a plurality of sub-regions, where each sub-region of the plurality of sub-regions may include real properties with a shared profile. The system may associate, with each sub-region, a collection of coordinate pairs, where each coordinate pair comprises a latitude and a longitude, and the collection describes a boundary of a geometric shape corresponding to the sub-region. The system may associate, with the geographic region, geometric shapes corresponding to the plurality of sub-regions. The system may associate, with each geometric shape, a rating factor for the real properties located within the sub-region corresponding to the geometric shape. The system may store the geometric shapes and rating factors, and may generate, based on the rating factor and for the real properties located within the sub-region, an output, and provide the generated output.

16 Claims, 7 Drawing Sheets

(56) References Cited

U.S. PATENT DOCUMENTS

| | | | |
|---|---|---|---|
| 8,103,445 | B2 | 1/2012 | Smith et al. |
| 8,260,489 | B2 | 9/2012 | Nielsen et al. |
| 8,289,160 | B1 | 10/2012 | Billman |
| 8,725,543 | B1 | 5/2014 | Hanson et al. |
| 8,731,999 | B2 | 5/2014 | Nielsen et al. |
| 8,799,035 | B2 | 8/2014 | Coleman et al. |
| 9,015,238 | B1 | 4/2015 | Anton et al. |
| 9,037,394 | B2 | 5/2015 | Fernandes et al. |
| 9,721,302 | B2 | 8/2017 | Tofte et al. |
| 9,858,621 | B1 | 1/2018 | Konrardy et al. |
| 10,121,207 | B1 | 11/2018 | Devereaux et al. |
| 10,217,169 | B2 | 2/2019 | Schumann, Jr. et al. |
| 10,304,313 | B1 | 5/2019 | Moon et al. |
| 10,497,250 | B1 | 12/2019 | Hayward et al. |
| 10,529,028 | B1 | 1/2020 | Davis et al. |
| 2014/0310162 | A1* | 10/2014 | Collins ............... G06F 3/04842 707/769 |
| 2015/0046194 | A1 | 2/2015 | Waddell et al. |
| 2016/0117778 | A1 | 4/2016 | Costello et al. |
| 2018/0336652 | A1* | 11/2018 | Wani ................... G06Q 50/265 |
| 2019/0304025 | A1 | 10/2019 | Szott |
| 2019/0362432 | A1* | 11/2019 | Trinko ................ G06F 16/9537 |
| 2021/0035226 | A1* | 2/2021 | Dybvik ............. G06Q 10/0635 |
| 2021/0279957 | A1* | 9/2021 | Eder ................ G06Q 10/06395 |

OTHER PUBLICATIONS

Zeeshan Akhtar, Building Footprints and AI, Jan. 21, 2020, Attentive AI Tech Blog retrieved from https://medium.com/attentive-ai/building-footprints-and-ai-eeae3271ed89 (Year: 2020).*

Innovations in the Use of Data Facilitating Insurance as a Resilience Mechanism for Coastal Flood Risk Science Direct Science of the Total Environment vol. 661, Apr. 15, 2019, pp. 598-612 36 pages.

GIS for Insurance esri GIS Best Practices Series Mar. 2012 8 pages.

Flood Risk Products Using Flood Risk Products in Hazard Mitigation Plans FEMA RiskMAP Jul. 2018 9 pages.

Jun. 2, 20228—(CA) Office Action—Application No. 3,115,923, 7 Pages.

* cited by examiner

DETERMINING GEOCODED REGION BASED RATING SYSTEMS FOR DECISIONING OUTPUTS

FIELD OF ART

Aspects of the disclosure generally relate to methods and computer systems, including one or more computers particularly configured and/or executing computer software to determine rating factors. More specifically, aspects of this disclosure relate to determining geocoded regions for rating systems.

BACKGROUND

Service providers often rely on geographical territories to provide pricing for various services. Generally, such territories are based on postal zone improvement plan (ZIP) codes. In some instances, the territories may be based on rectangular grids based on geolocation data. Once the territories are defined, they are generally not modified to when re-evaluating costs of services.

Postal ZIP codes facilitate delivery of mail and/or packages by the postal service, and/or other delivery services. However, postal ZIP codes are not aligned with other rating factors that may be used to determine costs associated with services. For example, a postal ZIP code may include a large number of properties with differing profiles. Also, for example, rectangular grids are generally fixed in size and may not capture various related factors. Utilization of geographic regions may change over time. For example, rural areas may become suburban, new highways may be constructed, areas may be devastated by disasters, natural or man-made, and/or one or more related factors may change. Accordingly, determining rating factors based on fixed geographical regions, such as, for example, geographical regions represented by a postal ZIP code, or a rectangular grid, may not be suitable for all services.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for determining geocoded regions for rating systems.

In some aspects, a geocoded territory rating system may include a geocoded territory rating data processing system and a geocoded territory rating data analysis system. The geocoded territory rating system may include at least one processor and a memory unit storing computer-executable instructions. In some embodiments, the computer-executable instructions may be stored in one or more non-transitory computer-readable media. The geocoded territory rating system may be configured to, in operation, determine, for a geographic region and via a computing device and based on geolocation data, a plurality of sub-regions, where each sub-region of the plurality of sub-regions may include real properties with a shared profile. The geocoded territory rating system may be configured to, in operation, associate, with each sub-region, a collection of coordinate pairs, where each coordinate pair comprises a latitude and a longitude, and the collection describes a boundary of a geometric shape corresponding to the sub-region. The geocoded territory rating system may be configured to, in operation, associate, with the geographic region, geometric shapes corresponding to the plurality of sub-regions in the geographic region. The geocoded territory rating system may be configured to, in operation, associate, with each geometric shape, a rating factor for the real properties located within the sub-region corresponding to the geometric shape. The geocoded territory rating system may be configured to, in operation, store, in a database, the geometric shapes and the associated rating factors. The geocoded territory rating system may be configured to, in operation, generate, based on the rating factor and for the real properties located within the sub-region, an output. The geocoded territory rating system may be configured to, in operation, provide, via the computing device and based on the geometric shape, the generated output.

In some aspects, the geocoded territory rating system may be configured to, in operation, receive, via the computing device, a request for an available recommendation associated with a property, where the request includes an address associated with the property. In some arrangements, the geocoded territory rating system may be configured to, in operation, convert the address to address coordinates comprising a latitude and a longitude, where the address coordinates correspond to a geolocation of the property. In some aspects, the geocoded territory rating system may be configured to, in operation, match, based on comparisons with the collections of coordinate pairs, the address coordinates with a geometric shape. In some arrangements, the geocoded territory rating system may be configured to, in operation, retrieve, based on the geometric shape, the associated rating factor. In some aspects, the geocoded territory rating system may be configured to, in operation, provide, in response to the request and via a graphical user interface and based on the rating factor, the generated output indicating the available recommendation.

In some aspects, the geocoded territory rating system may be configured to, in operation, associate a timestamp with the shape file, and the generated output may be based on the timestamp.

In some arrangements, the geocoded territory rating system may, in operation, determine, for the geographic region, a second plurality of sub-regions. In some aspects, the geocoded territory rating system may be configured to, in operation, update geometric shapes corresponding to the second plurality of sub-regions and update the shape file. In some arrangements, the geocoded territory rating system may, in operation, apply a second timestamp to the shape file, and update the rating factors. In some arrangements, the indication of the generated output may be based on the second timestamp.

In other aspects, the geocoded territory rating system may also be configured to, in operation, train a machine learning model to determine the plurality of sub-regions.

In some aspects, the generated output may include a recommendation for: a residential insurance product, a commercial insurance product, a vehicular insurance product, an insurance underwriting process, a marketing strategy, or a type of field deployment.

In some aspects, at least one geometric shape may correspond to a sub-region associated with a postal code.

In other aspects, at least one geometric shape may correspond to a sub-region associated with a rectangular grid based on geolocation data.

In some aspects, the shared profile may include one or more selected from the group consisting of a type of the real property, a value of the real property, a neighborhood crime rate, proximity to a body of water, proximity to a golf course, proximity to public transportation, location in a region prone to a natural disaster, position relative to a highway, and position relative to a mountain.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining geocoded regions for rating systems. As described herein, determining rating factors based on fixed geographical shapes, such as, for example, geographical shapes represented by a postal zone improvement plan (ZIP) code, or a rectangular grid, may not be suitable for insurance purposes. Generally, such geographical shapes are fixed, and are not based on insurance needs.

Generally, a geographical region corresponding to a postal ZIP code may include a large number of real properties that may have very different profiles. A ZIP code is utilized to allow mail to be delivered in an efficient and timely manner. Accordingly, the postal ZIP code may correspond to address groups or delivery routes. As such, a postal ZIP code may correspond to a geographical region that may span across neighboring states, and/or counties. In some instances, the geographical regions corresponding to two ZIP codes may overlap, be subsets of each other, or be artificial constructs with no geographic area. In some instances, a ZIP code may be divided and/or changed, for example, when a rural area becomes suburban. Also, for example, depopulation may cause a postal office to close, and cause the associated ZIP code to be deallocated. In some instances, postal boundaries may be realigned, and the corresponding ZIP codes may be changed. Accordingly, ZIP codes may not be a reliable tool to determine rating factors.

In some instances, the geographical regions may be associated with a rectangular grid defined by geolocation data. Geolocation data may include latitudinal and longitudinal data. For example, a location with GPS coordinates 41° 55' 55.542" N, 87° 38' 28.518" W may be associated with Lat/Long coordinates, such as, (41.932095, −87.641255). Accordingly, a rectangular grid may be defined by four pairs of Lat/Long coordinates, one for each corner of the grid. However, defining grids in this manner may overlook significant insurance related parameters, and may therefore not be a reliable tool to determine rating factors.

Generally, average costs related to homeowner's losses may greatly vary within a ZIP code. Personalized adjustments to insurance ratings generally require input from the homeowner. Accordingly, customized shapes based on properties with a shared profile may lead to greater personalization of insurance ratings, without imposing additional burdens on homeowners. Such customized shapes may also enable a better understanding of local insurance needs, and therefore lead to improvements in the services provided.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
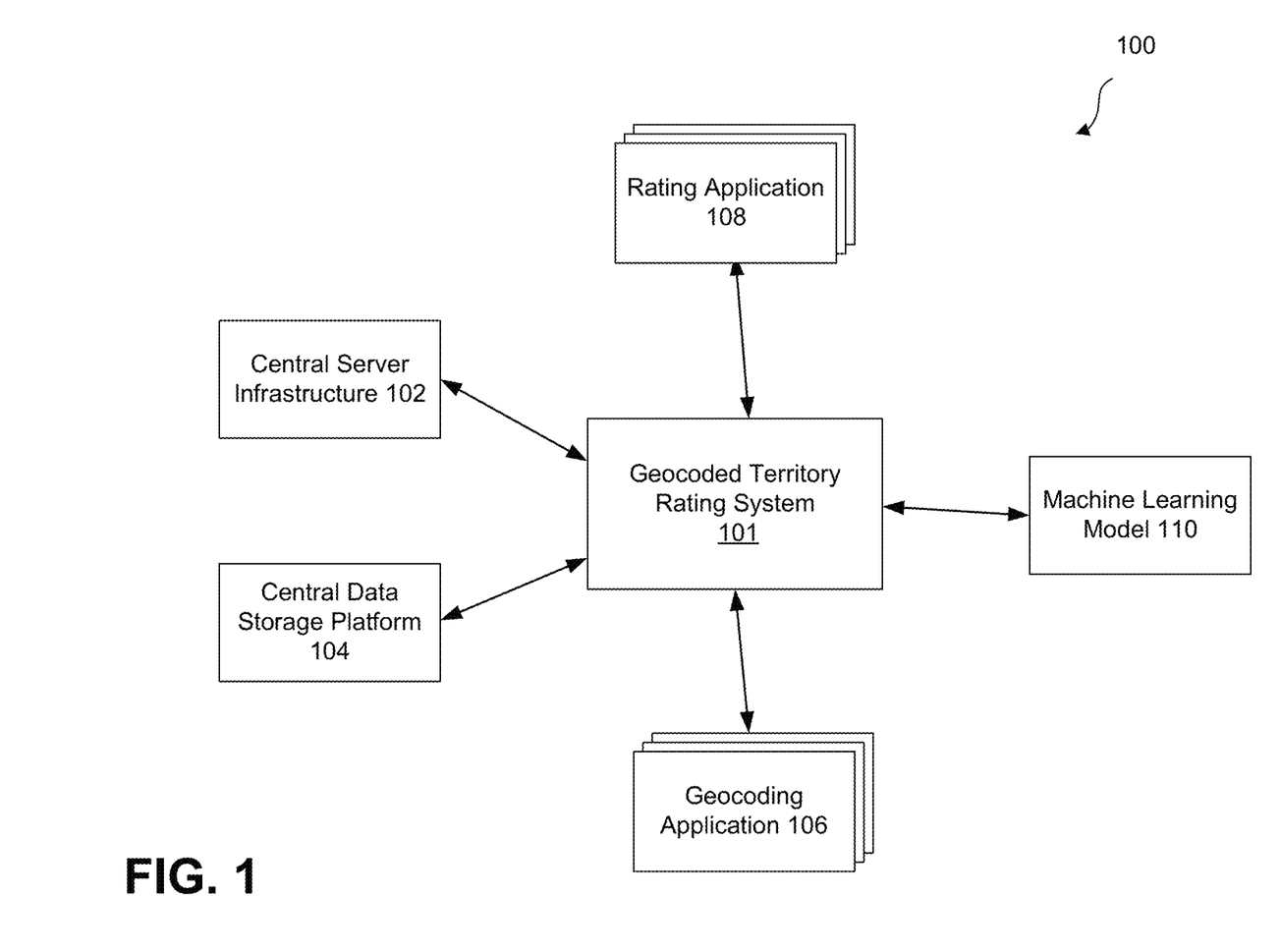
FIG. 1 shows a block diagram illustrating the system architecture for determining geocoded regions for rating systems in accordance with one or more aspects described herein.
Figure 4:
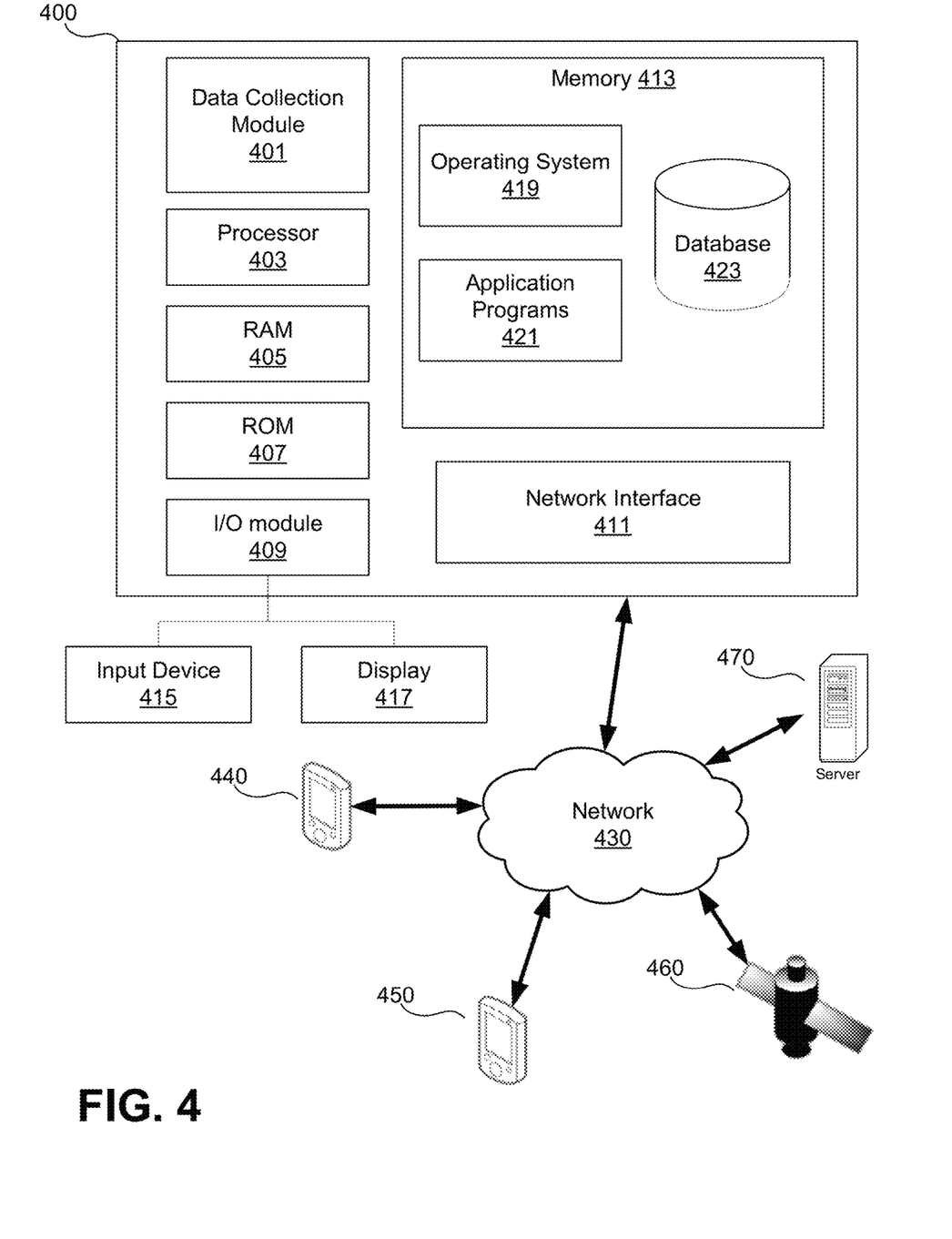
FIG. 4 illustrates an example geocoded territory rating device that may be used in accordance with one or more aspects described herein.

FIG. 1 shows a block diagram illustrating system architecture 100 for determining geocoded regions for rating system in accordance with one or more aspects described herein. A geocoded territory rating system 101 may determine, for a geographic region and based on geolocation data, a plurality of sub-regions, where each sub-region of the plurality of sub-regions may include real properties with a shared profile. In some instances, the geocoded territory rating system 101 may be or include one or more components of geocoded territory rating device 400, as shown in FIG. 4.

The term "geographic region" as used herein may be a country, state, a county, a city, a land area, a region (e.g., northwest, northeast), and so forth, and/or any portion thereof. Geolocation data may comprise data from a global positioning system (GPS), including, for example, positioning, navigation, and timing services. Also, for example, geolocation data may comprise latitudinal and longitudinal data. In some embodiments, a geographical region, such as a state, may be further subdivided into a plurality of sub-regions. As described herein, more effective decisioning outputs (e.g., recommendations) may be provided when similar properties are grouped together. Accordingly, the plurality of sub-regions, may include real properties with a shared profile. As used herein, the term "decisioning output" or "output" generally refers to an output of a decision making process.

Geocoding application 106 may be configured to include one or more applications that may analyze shared profiles and group similar properties together. In some embodiments, geocoding application 106 may be configured to convert latitude/longitude data to a physical address, and vice versa. Geocoding application 106 may be configured to associate a unique identifier with a geometric shape.

In some embodiments, the shared profile may include one or more of: a type of the real property, a value of the real property, a neighborhood crime rate, proximity to a body of water, proximity to a golf course, proximity to public transportation, location in a region prone to a natural disaster, position relative to a highway, and position relative to a mountain. The geocoding application 106 may determine the shared profile based on a type of the real property, such as, for example, an apartment, a condominium, a townhome, a single family home, a ranch-styled home, and so forth. In some embodiments, the type of the property may be based on a size (square foot area), a number and type of outdoor spaces, a size of a backyard, a number of bedrooms, a number of bathrooms, exterior structures such as a deck, a balcony, a roof. As another example, the type of the property may be based on whether the property has a basement, whether it is a walk-out basement, a type of foundation (e.g., poured, concrete slab, and so forth), whether there is parking, a type of parking (e.g., attached, detached, on-street, garage, valet), age of the structure, whether safety features are installed, and so forth.

In some embodiments, geocoding application 106 may determine the shared profile based on a value of the real property. For example, properties may be grouped based on their estimated market value. In some embodiments, properties with an estimated market value below $100,000 may belong to a first group, properties with an estimated market value between $100,000 and $225,000 may belong to a second group, properties with an estimated market value over $50 million may belong to a third group, and so forth.

Also, for example, geocoding application 106 may determine the shared profile based on a neighborhood crime rate. For example, properties in a neighborhood with a high crime rate may be grouped together. Likewise, properties in a neighborhood with a low crime rate may be grouped together. In some embodiments, the shared profile may be a proximity to a body of water. For example, the body of water may be a great lake, a river, an ocean, a sea, and so forth. Proximity to the body of water may determine a risk of loss due to floods, soil erosion, winds, hurricanes, and so forth. Accordingly, properties with such shared attributes may have a shared profile.

As another example, geocoding application 106 may determine the shared profile based on a proximity to a golf course. For example, properties situated on or near a golf course may be grouped together for insurance rating purposes. In some example, a position of a property near a golf course may determine a level of expected damage to the property (e.g., from stray and/or misdirected golf balls).

In some embodiments, geocoding application 106 may determine the shared profile based on proximity to public transportation. For example, properties along a train line may be grouped together for insurance purposes. Also, for example, proximity to an airport may be the shared profile. In some embodiments, the shared profile may be a position relative to a highway. For example, a location of a property on one side of the highway may determine a higher rating factor. As another example, a location of a property on another side of the highway may determine a lower rating factor.

In some embodiments, geocoding application 106 may determine the shared profile based on a location in a region prone to a natural disaster. For example, properties proximate to a large forested area may be at a greater risk of damage from forest fires. Accordingly, such properties may be grouped together. As another example, properties in a region prone to earthquakes, and/or along fault lines, may be grouped together. In some examples, natural disasters such as hurricanes, floods, tornadoes, volcanoes, high wind, hail, snow storms, and so forth, may determine the shared profile.

In some embodiments, geocoding application 106 may determine the shared profile based on a position relative to a mountain. For example, a side of a mountain may determine levels of rainfall, wind speed, an amount of sunlight, and so forth. Accordingly, properties with such shared attributes may have a shared profile.

In some embodiments, geocoded territory rating system 101 may associate, with each sub-region, a collection of coordinate pairs, where each coordinate pair comprises a latitude and a longitude, and the collection describes a boundary of a geometric shape corresponding to the sub-region. In some embodiments, geocoded territory rating system 101 may determine the sub-region based on the shared profile. Accordingly, a sub-region may be determined to include the townhomes. In some embodiments, a collection of coordinate pairs (e.g., latitude/longitude data), may be used to represent a boundary of the sub-region. In some example, the points represented by the coordinate pairs may be connected to form a polygonal geometric shape. Accordingly, the collection of coordinate pairs may describe a boundary of a geometric shape corresponding to the sub-region comprising single family homes. In some aspects, a larger number of points on the boundary of the sub-region will result in a polygon with a larger number of sides, and such a polygon may, in turn, provide a better approximation to the sub-region.

In some embodiments, geocoded territory rating system 101 may determine the sub-region based on proximity to a river. Accordingly, a sub-region may be determined to include properties that are within 5 miles east of a river. In some embodiments, a collection of coordinate pairs (e.g., latitude/longitude data), may be used to represent a boundary of the sub-region. For example, the coordinate pairs may represent a first set of locations along a bank of the river, and a second set of locations that are 5 miles east of the river. Additional coordinate points may be determined to locate a northern and a southern boundary of the sub-region. In some example, the points represented by the coordinate pairs may be connected to form a polygonal geometric shape. Accordingly, the collection of coordinate pairs may describe a boundary of a geometric shape corresponding to the sub-region that describes proximity to a river.

In some embodiments, geocoded territory rating system 101 may determine the sub-region based on a proximity to a golf course. Accordingly, a sub-region may be determined to include properties that are within and around a golf course. In some embodiments, a collection of coordinate pairs (e.g., latitude/longitude data), may be used to represent a boundary of the sub-region. For example, the coordinate pairs may represent locations along an outer edge of a golf neighborhood. In some embodiments, the points represented by the coordinate pairs may be connected to form a polygonal geometric shape. Accordingly, the collection of coordinate pairs may describe a boundary of a geometric shape corresponding to the sub-region that describes proximity to a golf course.

In some embodiments, geocoded territory rating system 101 may determine the sub-region based on proximity to a region prone to a natural disaster. For example, properties proximate to a large forested area may be at a greater risk of damage from forest fires. Accordingly, a sub-region may be determined to include properties that are within and around a perimeter of the forest. In some embodiments, a collection of coordinate pairs (e.g., latitude/longitude data), may be used to represent a boundary of the sub-region. For example, the coordinate pairs may represent locations that are within 15 miles of a perimeter of the forested area. In some examples, the points represented by the coordinate pairs may be connected to form a polygonal geometric shape. Accordingly, the collection of coordinate pairs may describe a boundary of a geometric shape corresponding to the sub-region that describes proximity to a forested area.

As described herein, geocoded territory rating system 101 may determine the sub-region based on a variety of factors related to an insurance rating, and may determine a collection of coordinate pairs to represent a boundary of the sub-region. The points represented by these coordinates may be connected to form a polygonal shape. In some embodiments, a free-form geometric shape may be utilized to determine the geometric shape. In some embodiments, a computer drawing tool may be utilized to draw sub-regions on a map representing a geographic region. For example, a natural boundary of a river, a coastline, an earthquake fault line, and so forth may be used to describe at least a portion of a boundary of a geometric shape.

Figures 2A, 2B, 2C:
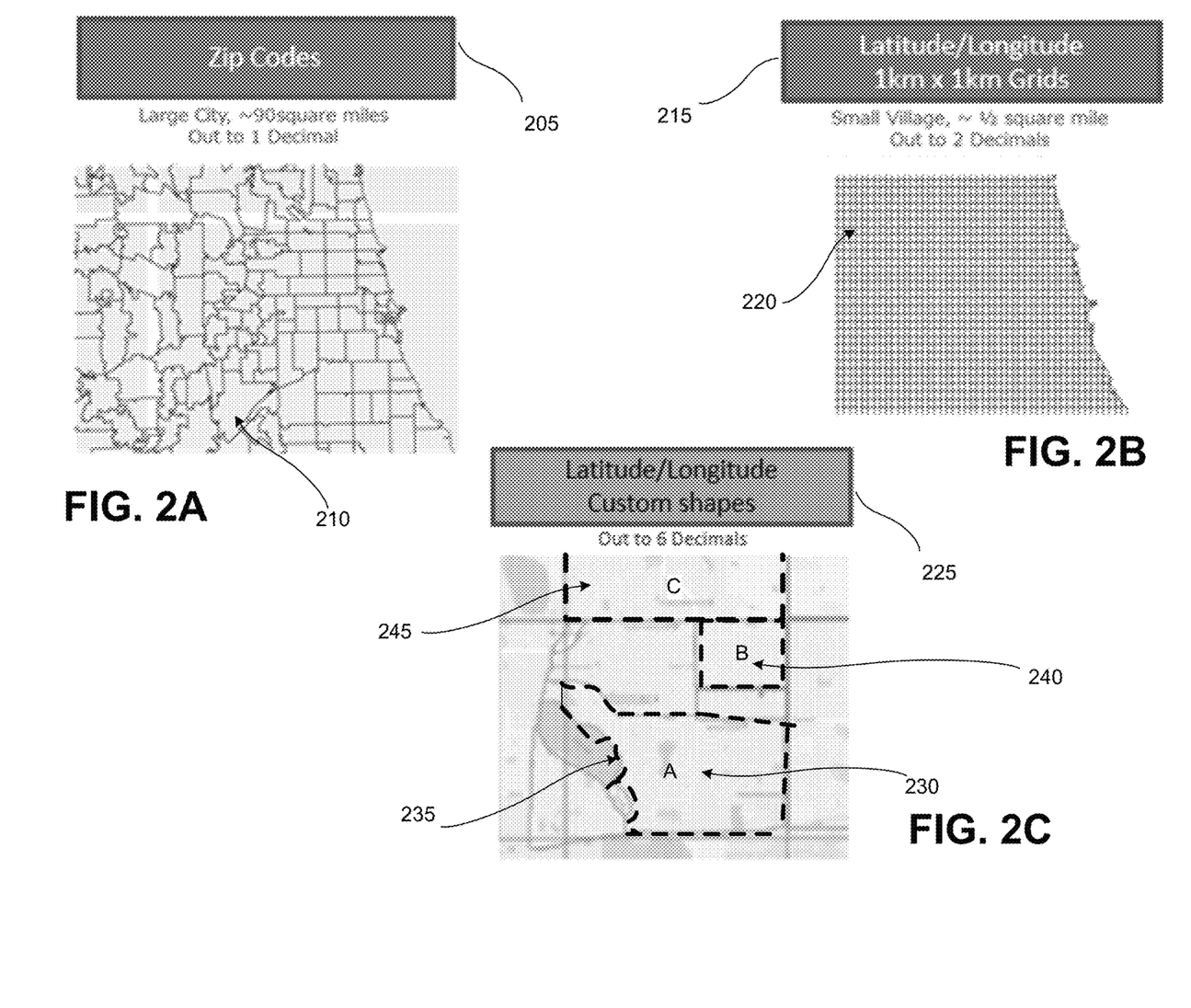
FIGS. 2A-C illustrate example geometric shapes in accordance with one or more aspects described herein.

In some aspects, at least one geometric shape may correspond to a sub-region associated with a postal code. FIG. 2A illustrates an example geometric shape in accordance with one or more aspects described herein. For example, the sub-regions may be determined based on ZIP codes 205. A sub-region 210 is illustrated that corresponds to a ZIP code.

In other aspects, at least one geometric shape may correspond to a sub-region associated with a rectangular grid based on geolocation data. FIG. 2B illustrates an example geometric shape in accordance with one or more aspects described herein. For example, the sub-regions may be determined based on grids 215. A sub-region 220 is illustrated that corresponds to a grid. The geographic region may be a small village, and each grid may be a square having a side length of 1 kilometer. As described herein, such grids are all of the same size. The four corners of each grid may be represented by coordinate pairs comprising latitude/longitude data.

FIG. 2C illustrates an example geometric shape in accordance with one or more aspects described herein. As illustrated, the geometric shapes 225 may be based on insurance related criteria. For example, a first sub-region A 230 may be adjacent to a body of water, and a portion of a boundary 235 of the first sub-region A 230 may share a boundary with the body of water. As another example, a second sub-region B 240 may be a square grid (based on latitude/longitude coordinates corresponding to the four corners of the square grid). Also, for example, a third sub-region C 245 may correspond to a sparsely populated rural area with very few properties. In some embodiments, the third sub-region C 245 may correspond to a postal ZIP code.

Referring again to FIG. 1, in some embodiments, geocoded territory rating system 101 may train a machine learning model 110 to determine the plurality of sub-regions. The machine learning model 110 may utilize one or more tools such as, for example, a linear regression, a decision tree, a support vector machine, a random forest, a k-means algorithm, gradient boosting algorithms, dimensionality reduction algorithms, and so forth. For example, machine learning model 110 may be provided with a plurality of rating factors, and sub-regions that have been determined based on such factors. Accordingly, machine learning model 110 may be trained via supervised learning techniques, based on such labeled data, to learn an association between the plurality of rating factors and determined sub-regions. Based on such information, machine learning model 110 may be trained to determine additional sub-regions. In some embodiments, machine learning model 110 may apply image analysis to satellite and/or aerial images of a region, to identify types of neighborhoods (e.g., downtown, residential, townhome complex, single family homes, outdoor swimming pools, proximity to a highway, proximity to a rail system, proximity to a body of water, and so forth). Accordingly, machine learning model 110 may determine the sub-regions based on such image analysis.

In some instances, image data may be unstructured, and a combination of supervised and semi-supervised learning techniques may be utilized to train machine learning model 110. For example, machine learning model 110 may be configured to detect patterns in images, and apply these patterns to detect a terrain, a type of housing, a type of neighborhood, and so forth, in new images. Also, for example, machine learning model 110 may be configured to detect patterns between neighborhoods with high crime rates and neighborhoods with low crime rates. The machine learning model 110 may be configured to analyze such and other factors, determine patterns, and determine sub-regions based on such patterns. In some embodiments, an output of the machine learning model 110 may be reviewed by a human operator. Accordingly, the human operator may confirm the analysis or modify it, and this may form additional training data for the machine learning model 110.

In some embodiments, geocoded territory rating system 101 may associate, with the geographic region, a shape file, where the shape file may be indicative of geometric shapes corresponding to the plurality of sub-regions in the geographic region. In some embodiments, geocoding application 106 may associate a unique identifier with each geometric shape in a geographical region. For example, referring to FIG. 2C, the geographic region may be the state of Illinois, and the first sub-region 230 may be associated with a first identifier, such as, for example, "IL0001." Similarly, the second sub-region 240 may be associated with a second identifier, such as, for example, "IL0002," and the third sub-region 245 may be associated with a third identifier, such as, for example, "IL0003." Additional sub-regions may be associated with unique identifiers.

In some embodiments, geocoded territory rating system 101 may generate a shape file comprising, for each geometric shape, a unique identifier corresponding to the sub-region represented by the geometric shape, and the collection of coordinates that describe a boundary of the geometric shape. Accordingly, the state of Illinois may be associated with a shape file. As described herein, the shape file may be representative of sub-regions that include properties with a shared profile.

In some embodiments, a geographical region may be associated with more than one shape file. For example, the shared profile may determine a shape file, and different shape files may correspond to different shared profiles. For example, a first shape file may be generated based on proximity to a lake, and a second shape file may be generated based on a type of housing. In some embodiments, the first shape file and the second shape file may be combined to generate a third shape file. Accordingly, the third shape file may be representative of sub-regions that include properties that are proximate to the lake, and that are of the same type of housing.

In some embodiments, geocoded territory rating system 101 may associate a timestamp with the shape file. The timestamp is generally indicative of a date, and/or a range of dates, when the geometric shapes in the shape file may be used to determine rating factors. Accordingly, outputs that are based on the shape file may be time-dependent, and the timestamp may provide effective dates for use of the shape file.

In some examples, geocoding application 106 may modify and/or update the sub-regions dynamically based on changes to underlying insurance factors. For example, an area may be developed commercially, and geocoding application 106 may modify the sub-regions based on such commercial development. Accordingly, geocoded territory rating system 101 may determine, for the geographic region, a second plurality of sub-regions. Also, for example, geocoded territory rating system 101 may update geometric shapes corresponding to the second plurality of sub-regions and update the shape file. In some arrangements, geocoded territory rating system 101 may apply a second timestamp to the shape file, and update rating factors to reflect the commercial development.

As another example, a residential community may be built (e.g., in a suburban area that may have been a farmland), with single family homes, shops, restaurants, highways, and so forth. Accordingly, a profile for the region may be transformed, and geocoding application 106 may modify the sub-regions based on such residential development. In some embodiments, geocoded territory rating system 101 may determine, for the geographic region, a second plurality of sub-regions. Also, for example, geocoded territory rating system 101 may update geometric shapes corresponding to the second plurality of sub-regions and update the shape file. In some arrangements, geocoded territory rating system 101 may apply a second timestamp to the shape file, and update rating factors to reflect the residential development.

As another example, a new highway may be built, and/or an existing highway may be expanded. Also, for example, a train route (e.g., a subway or metro system) may be constructed, or an existing route may be expanded. Accordingly, the geocoded territory rating system 101 may apply a second timestamp to the shape file, and update rating factors to reflect the changes to the highways and/or train routes.

In some embodiments, machine learning model 110 may detect a change to a region (e.g., construction of an airport, expansion of a highway, construction of a residential neighborhood, construction of a golf course, elevated water levels in a body of water, and so forth). Accordingly, machine learning model 110 may determine, for the geographic region, a second plurality of sub-regions. Also, for example, machine learning model 110 may update geometric shapes corresponding to the second plurality of sub-regions and update the shape file. In some arrangements, machine learning model 110 may apply a second timestamp to the shape file, and update rating factors to reflect the detected change.

In some embodiments, geocoded territory rating system 101 may associate, with each geometric shape in the shape file, a rating factor for the real properties located within the sub-region corresponding to the geometric shape. The term "rating factor" as used herein, generally refers to one or more factors used by a service provider in determining rates. In some aspects, the rating factor may relate to one or more of: a residential building or structure insurance product, a commercial building or structure insurance product, a vehicular insurance product, a life insurance product, an insurance underwriting process, a marketing strategy, and a type of field deployment.

In some embodiments, the rating factors for residential properties may include a replacement cost, any remodeling, presence of a wood burning stove, presence of a fireplace, presence or absence of pets, presence of a swimming pool, age and/or construction of a home, proximity to a fire station, proximity to a body of water, presence of large trees, and so forth. In some embodiments, rating application 108 may determine, for each geometric shape in the shape file, the rating factor for a residential property, based at least in part on their geographical location, and factors such as, proximity to a fire station, proximity to a body of water, and so forth.

For example, for vehicular insurance, the rating factors may include an age of a driver, a gender of the driver, a number of years of driving experience, a geographical location, a driving history, a claims history, an accident history, a credit history, an average number of miles a vehicle is driven each year, a type of vehicle, an age of the vehicle, and so forth. In some embodiments, rating application 108 may determine, for each geometric shape in the shape file, the rating factor for vehicles, based at least in part on their geographical location. In some embodiments, rating application 108 may determine the rating factor based on how far the vehicle is driven each day, and a type of commute.

As another example, the rating factors for a commercial building may include occupancy, construction, protection, and exposure. For example, local codes may require the use of fire resistive material. Accordingly, downtown commercial buildings in a particular city may share this profile. In some embodiments, geocoding application 106 may determine the shared profile to be a use of fire resistive material in building construction, and geocoded territory rating system 101 may determine a sub-region and an associated geometric shape. In some embodiments, rating application 108 may determine the rating factor based on the sub-region indicative of commercial buildings constructed with fire resistive material.

As another example, protection may be another criterion for insurance rating. For example, proximity to a fire department and an adequacy of the water supply may be two factors that may be based, in part, on a location of the commercial building. For example, a city downtown with frequent traffic issues may provide a less reliable protection. Also, for example, a commercial building in a semi-urban location (with a fire department that is further away than a threshold distance) may have less reliable protection. In some embodiments, rating application 108 may determine the rating factor based on the sub-region indicative of commercial buildings with a certain level of protection.

Also, for example, exposure may be a criterion for insurance rating. For example, a level of exposure to natural hazards, such as, for example, high winds, hail, lightning, heavy snow, and so forth, may be based on a geographical location. In some embodiments, rating application 108 may determine the rating factor based on the sub-region indicative of commercial buildings with a certain level of exposure.

In some aspects, the rating factor may relate to a marketing strategy. For example, geocoded territory rating system 101 may provide the shape file for a geographical region to a marketing team. The marketing team may develop targeted marketing and/or advertisement materials based on shape file. In some embodiments, geocoded territory rating system 101 may provide the marketing and/or advertisement materials to a target audience based on the determined sub-regions in the shape file. In some embodiments, machine learning model 110 may be configured to train based on existing materials targeting a first collection of sub-regions, and develop marketing strategy and/or material for additional sub-regions. In some embodiments, machine learning model 110 may be configured to provide the marketing and/or advertisement materials to the target audience based on the determined sub-regions.

In some aspects, the rating factor may relate to a type of field deployment. For example, some sub-regions such as remote areas or inaccessible areas may not be conducive to a deployment of field personnel. Accordingly, geocoded territory rating system 101 may cause drones to deliver products to such sub-regions that represent remote and/or inaccessible areas. In some embodiments, urban areas may be served by field personnel, and geocoded territory rating system 101 may cause deployment of the field personnel to such sub-regions that represent urban areas.

In some aspects, the rating factor may relate to an insurance underwriting process. For example, crime rates, demographics, age, gender, employment status, and so forth, may be used as factors to determine sub-regions. Accordingly, geocoded territory rating system 101 may provide the shape file to insurance underwriters, and the insurance underwriting process may be based on the determined sub-regions.

The central data storage platform 104 may be incorporated into the geocoded territory rating system 101 or may be separate components. As an example, central data storage platform 104 may be configured to store, for each geographic region, the shape file, including the geometric shapes, associated collections of coordinate pairs that describe the boundary of the geometric shapes, associated unique identifiers, associated rating factors, associated timestamps, and so forth. In some embodiments, central data storage platform 104 may be configured to be indexed so as to be a readily searchable database.

Also, for example, the central data storage platform 104 may include one or more of a home profile database, a hazard database, a weather database, a database to store aerial images (from drones, satellites, and so forth), a vehicle ratings database, a driver safety rating database, a driving behaviors database, an accounts and billing database, a vehicle information database, a driving history database, a credit history database, and other types of databases. That is, central data storage platform 104 may store one or more of vehicle ratings, driver safety ratings, driving behaviors, accounts and billing information, vehicle information, driving history information, and other types of data. The data stored in central data storage platform 104 may be collected and compiled by the geocoded territory rating system 101, the geocoding application 106, the rating application 108, and the machine learning model 110, or by servers and subsystems within the geocoded territory rating system 101. In some embodiments, geocoded territory rating system 101 may collect information from, and transmit information to, each of the various applications, databases, devices, and backend servers described in FIG. 4.

In some embodiments, geocoded territory rating system 101 may communicate with central server infrastructure 102 and receive data related to changes in profiles, construction information, accident information, weather information, traffic information, etc. Geocoded territory rating system 101 may collect real-time data from drones and/or satellites. In some examples, real-time data may be transmitted by the geocoded territory rating system 101 (e.g., via the geocoding application 106, the rating application 108, and the machine learning model 110, and so forth) to the central server infrastructure 102.

In some examples, geocoded territory rating system 101 may also be configured to receive, by the geocoded territory rating device (e.g., geocoded territory rating device 400), and from a central server (e.g., central server infrastructure 102), certain configuration data. Generally, the term "configuration data" as used herein, may refer to logic that may be applied to one or more components of geocoded territory rating system 101. For example, the central server (e.g., central server infrastructure 102) may provide logic to update functionalities of the machine learning model 110, rating application 108, and geocoding application 106. In some aspects, geocoded territory rating system 101 may be configured to dynamically update, based on the configuration data, a configuration of the geocoded territory rating device 400, and/or a configuration of one or more of the geocoding application 106, the rating application 108, and the machine learning model 110. In some embodiments, geocoded territory rating system 101 may utilize machine learning model 110 to assist with various steps in data collection, assessment, analysis, and determination of shape files. Machine learning model 110 may coordinate, for example, with rating application 108, to determine if changes to a region suggest that rating factors may need to be updated.

In some embodiments, geocoded territory rating system 101 may be configured to generate, based on the rating factor and for the real properties located within the sub-region, an output. For example, the output may be a recommendation related to an insurance product, a recommendation for one or more steps in underwriting an insurance product, a recommendation for a marketing campaign or strategy (including, for example, costs associated with the campaign or strategy), a decision to deploy a field personnel or a drone to evaluate a claim, a decision to approve or deny an insurance claim, and so forth. The output may be generated based on the rating factor. For example, the output may be a recommended insurance premium for a real property, which may depend on the rating factor. As another example, the output may be a decision to send a field personnel or a drone to evaluate an insurance claim, and the decision may be based on the rating factor. Also, for example, the output may be a marketing campaign strategy (e.g., a decision to mail fliers, to send electronic mail, to make telephone calls, to place advertisements in local television channels, etc.), and the strategy may be based on the rating factor.

In some embodiments, geocoded territory rating system 101 may be configured to provide, via the computing device and based on the geometric shape, the determined output. For example, the determined output may be recommendation for a residential insurance product or service, a commercial insurance product or service, a vehicular insurance product or service, an insurance underwriting process, a marketing strategy, and a type of field deployment.

In some embodiments, the determined output may be based on the timestamp associated with the shape file. For example, a sub-region in which a property is located may change (e.g., based on one or more rating factors described herein), and accordingly, the indication of the available product may change as well. A first request for an insurance claim may correspond to a first point in time, and geocoded territory rating system 101 may process the claim based on a first timestamp associated with a first geometric shape corresponding to the first time. Subsequent to the time of the loss related to the insurance claim, geocoded territory rating system 101 may have changed the sub-region associated with the property. Accordingly, for the same property, a second request for an insurance estimate (e.g., based on an addition of an external swimming pool) may correspond to a second point in time, and geocoded territory rating system 101 may process the second request based on a second timestamp associated with a second geometric shape corresponding to the second time.

For example, geocoded territory rating system 101 may be configured to receive, via the computing device, a request for the insurance product or service, where the request includes an address of a property. Accordingly, geocoding application 106 may convert the address to address coordinates comprising a latitude and a longitude, where the address coordinates correspond to a geolocation of the property. In some embodiments, geocoded territory rating system 101 may be configured to match, based on comparisons with the collections of coordinate pairs, the address coordinates with a geometric shape. For example, a collection of coordinate pairs may describe a polygonal shape, and the address coordinates may be compared with each collection of coordinate pairs to determine if the address coordinates belong to the polygonal shape. Upon a determination of a match with a shape file and a geometric shape, geocoded territory rating system 101 may be configured to retrieve, based on the geometric shape, the associated rating factor. For example, geocoded territory rating system 101 may be configured to retrieve, from central data storage platform 104, the rating factor associated with the shape file. Also, for example, geocoded territory rating system 101 may be configured to provide, in response to the request and via a graphical user interface and based on the rating factor, the indication of the available insurance product or service.

Figure 3A:
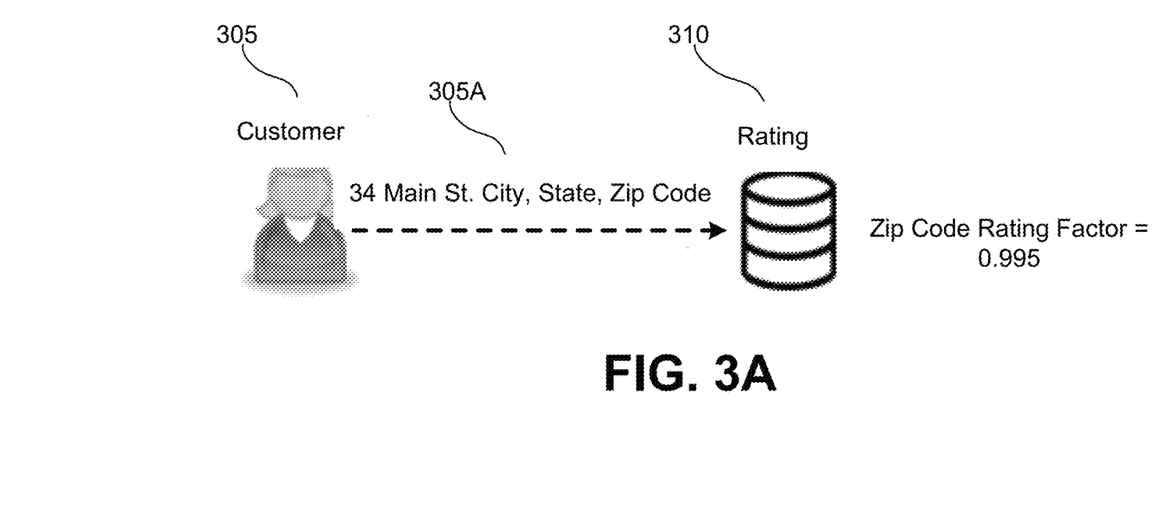
FIGS. 3A-B illustrate example rating factor computation processes in accordance with one or more aspects described herein.

FIG. 3A illustrates an example rating factor computation process in accordance with one or more aspects described herein. For example, geocoded territory rating system 101 may receive a request, from customer 305, for an insurance product or service, where the request includes an address 305A of a property (e.g., 34 Main St. City, State, ZIP Code). As described herein, the sub-region may be based on a ZIP code, and geocoded territory rating system 101 may retrieve, from central data storage platform 104, the insurance rating factor 310 associated with the ZIP code. For example, for a sub-region based on a ZIP code, the insurance rating factor 310 may be determined to be 0.995.

Figure 3B:
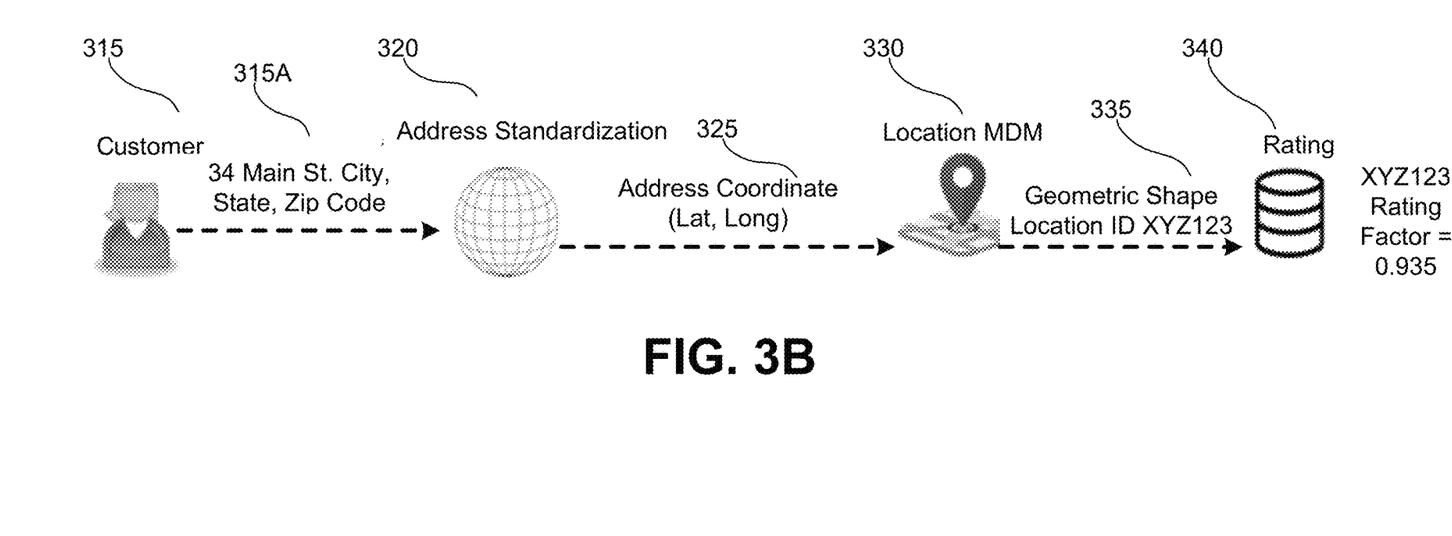

FIG. 3B illustrates an example rating factor computation process in accordance with one or more aspects described herein. For example, geocoded territory rating system 101 may receive a request, from customer 315, for an insurance product or service, where the request includes an address 315A of a property (e.g., 34 Main St. City, State, ZIP Code). In some embodiments, geocoded territory rating system 101 may perform an address standardization 320 (e.g., transform an address into a predetermined format). In some embodiments, geocoding application 106 may convert the address to address coordinates 325 comprising a latitude and a longitude, where the address coordinates correspond to a geolocation of the property at address 315A. As described herein, the sub-region may be based on a customized shape, and geocoded territory rating system 101 may access a location database management system 330 (e.g., within central data storage platform 104). Subsequently, geocoded territory rating system 101 may match, based on comparisons with the collections of coordinate pairs, the address coordinates 325 with a geometric shape 335, with a unique location identifier, such as, for example, "XYZ123." As described herein, geocoded territory rating system 101 may retrieve, from the location database management system 330, the insurance rating factor 340 associated with the geometric shape 335. For example, for the geometric shape 335 with location identifier "XYZ123," the insurance rating factor 340 may be determined to be 0.935. As illustrated herein, utilizing a customized shape (e.g., standard polygons such as square, hexagon, octagon, or the like, as well as non-standard, free-form shapes), such as geometric shape 335, may provide an insurance rating factor (e.g., 0.935), that may be different from an insurance rating factor based on postal ZIP codes (e.g., 0.995).

Referring back to FIG. 1, although the rating application 108, the machine learning model 110, and the geocoding application 106 are shown as separate elements from the geocoded territory rating system 101, one or more of them may be within the same structure. In particular, geocoded territory rating system 101 may be configured to perform one or more (or all) functions performed by machine learning model 110, rating application 108, and geocoding application 106.

In one or more arrangements, aspects of the present disclosure may be implemented with a computing device. FIG. 4 illustrates a block diagram of an example geocoded territory rating device 400 that may be used in accordance with aspects described herein. The geocoded territory rating device 400 may be a computing device such as a personal computer (e.g., a desktop computer), server, laptop computer, notebook, tablet, smartphone, etc.

The geocoded territory rating device 400 may have a data collection module 401 for retrieving and/or analyzing data as described herein. The data collection module 401 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 401 may refer to the software and/or hardware used to implement the data collection module 401. In cases where the data collection module 401 includes one or more processors, such processors may be specially configured to perform the processes disclosed herein. Additionally, or alternatively, the data collection module 401 may include one or more processors configured to execute computer-executable instructions, which may be stored on a storage medium, to perform the processes disclosed herein. In some examples, geocoded territory rating device 400 may include one or more processors 403 in addition to, or instead of, the data collection module 401. The processor(s) 403 may be configured to operate in conjunction with data collection module 401. Both the data collection module 401 and the processor(s) 403 may be capable of controlling operations of the geocoded territory rating device 400 and its associated components, including RAM 405, ROM 107, an input/output (I/O) module 409, a network interface 411, and memory 413. For example, the data collection module 401 and processor(s) 403 may each be configured to read/write computer-executable instructions and other values from/to the RAM 405, ROM 107, and memory 413.

The I/O module 409 may be configured to be connected to an input device 415, such as a microphone, keypad, keyboard, touchscreen, and/or stylus through which a user of the geocoded territory rating device 400 may provide input data. The I/O module 409 may also be configured to be connected to a display device 417, such as a monitor, television, touchscreen, etc., and may include a graphics card. The display device 417 and input device 415 are shown as separate elements from the geocoded territory rating device 400; however, they may be within the same structure. On some geocoded territory rating devices 400, the input device 415 may be operated by an enterprise agent to interact with the data collection module 401, including providing information about an incident and/or preferences, customer information, account information, rating information, training data for machine learning, etc. System administrators may use the input device 415 to make updates to the data collection module 401, such as software updates. Meanwhile, the display device 417 may assist the system administrators and users to confirm/appreciate their inputs.

The memory 413 may be any computer-readable medium for storing computer-executable instructions (e.g., software). The instructions stored within memory 413 may enable the geocoded territory rating device 400 to perform various functions. For example, memory 413 may store software used by the geocoded territory rating device 400, such as an operating system 419 and application programs 421, and may include an associated database 423.

Although not shown in FIG. 4, various elements within memory 413 or other components in the geocoded territory rating device 400 may include one or more caches, for example, CPU caches used by the processing unit 403, page caches used by the operating system 419, disk caches of a hard drive, and/or database caches used to cache content from database 423. For embodiments including a CPU cache, the CPU cache may be used by one or more processors in the processor 403 to reduce memory latency and access time. In such examples, the processor 403 may retrieve data from or write data to the CPU cache rather than reading/writing to memory 413, which may improve the speed of these operations. In some examples, a database cache may be created in which certain data from a central database of for example one or more enterprise servers 470 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 470. These types of caches and others may be included in various embodiments, and may provide potential advantages in certain implementations of retrieving and analyzing field data and/or local data, such as faster response times and less dependence on network conditions when transmitting/receiving geolocation data from a satellite 460, and/or data from one or more enterprise servers 470.

The network interface 411 may allow the geocoded territory rating device 400 to connect to and communicate with a network 430. The network 430 may be any type of network, including a local area network (LAN) and/or a wide area network (WAN), such as the Internet, a cellular network, or satellite network. Through the network 430, the geocoded territory rating device 400 may communicate with one or more other computing devices 440, such as laptops, notebooks, smartphones, tablets, personal computers, servers, vehicles, home management devices, home security devices, smart appliances, etc. Through the network 430, the geocoded territory rating device 400 may communicate with the satellite 460. Through the network 430, the geocoded territory rating device 400 may communicate with one or more enterprise servers 470 to exchange related insurance information and data. Through the network 430, the geocoded territory rating device 400 may communicate with one or more external computing devices, such as customer device 440, and/or a field agent's device 450.

The network interface 411 may connect to the network 430 via communication lines, such as coaxial cable, fiber optic cable, etc., or wirelessly using a cellular backhaul or a wireless standard, such as IEEE 802.11, IEEE 802.15, IEEE 802.16, etc. Further, the network interface 411 may use various protocols, including TCP/IP, Ethernet, File Transfer Protocol (FTP), Hypertext Transfer Protocol (HTTP), etc., to communicate with other customer device 440, field agent's device 450, satellite 460, and/or enterprise servers 470.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies.

Figure 5:
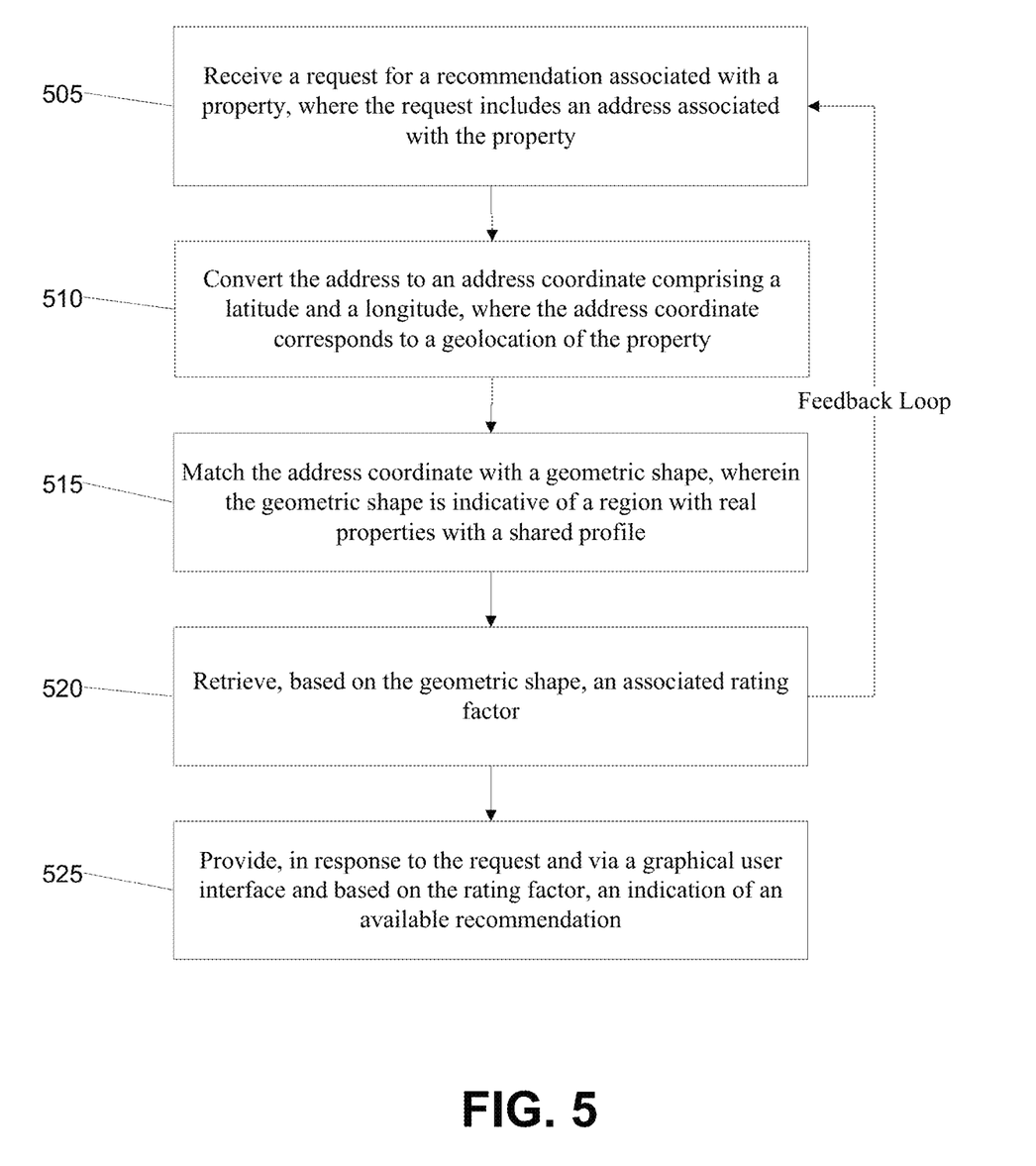
FIG. 5 illustrates an example method for determining geocoded regions for rating systems in accordance with one or more aspects described herein.

FIG. 5 illustrates an example method for determining geocoded regions for rating systems in accordance with one or more aspects described herein.

At step 505, geocoded territory rating system 101 may receive a request for a recommendation associated with a property, where the request includes an address associated with the property.

At step 510, geocoded territory rating system 101 may convert the address to address coordinates comprising a latitude and a longitude, where the address coordinates correspond to a geolocation of the property.

At step 515, geocoded territory rating system 101 may match the address coordinates with a geometric shape, where the geometric shape is indicative of a region with real properties with a shared profile.

At step 520, geocoded territory rating system 101 may retrieve, based on the geometric shape, an associated rating factor. In some embodiments, the process may return to step 505. For example, a change in the rating factor may cause geocoded territory rating system 101 to interact with a customer, and may initiate a new request from the customer.

At step 525, geocoded territory rating system 101 may, in response to the request, provide, via a graphical user interface and based on the rating factor, an indication of an available recommendation.

Figure 6:
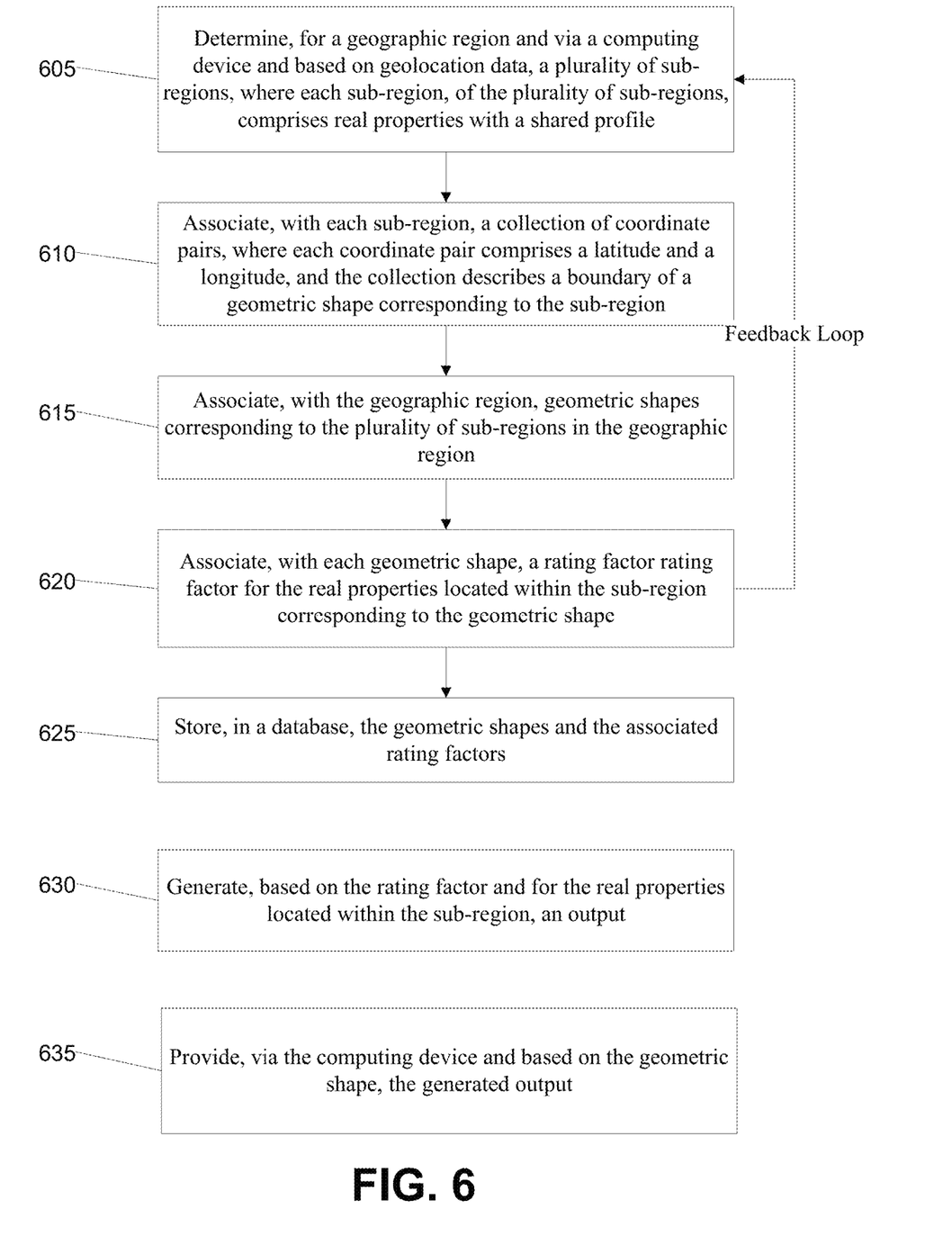
FIG. 6 illustrates another example method for determining geocoded regions for rating systems in accordance with one or more aspects described herein.

FIG. 6 illustrates another example method for determining geocoded regions for rating systems in accordance with one or more aspects described herein.

At step 605, geocoded territory rating system 101 may determine, for a geographic region and via a computing device and based on geolocation data, a plurality of sub-regions, where each sub-region of the plurality of sub-regions comprises real properties with a shared profile.

At step 610, geocoded territory rating system 101 may associate, with each sub-region, a collection of coordinate pairs, where each coordinate pair comprises a latitude and a longitude, and the collection describes a boundary of a geometric shape corresponding to the sub-region.

At step 615, geocoded territory rating system 101 may associate, with the geographic region, geometric shapes corresponding to the plurality of sub-regions in the geographic region.

At step 620, geocoded territory rating system 101 may associate, with each geometric shape, a rating factor for a product available for the real properties located within the sub-region corresponding to the geometric shape. In some embodiments, the process may return to step 605. For example, a change in the rating factor may cause geocoded territory rating system 101 to review the sub-regions, and/or modify the sub-regions.

At step 625, geocoded territory rating system 101 may store, in a database, the geometric shapes and the associated rating factors.

At step 630, geocoded territory rating system 101 may generate, based on the rating factor and for the real properties located within the sub-region, an output.

At step 635, geocoded territory rating system 101 may provide, via the computing device and based on the geometric shape, the generated output.

Figure 7:
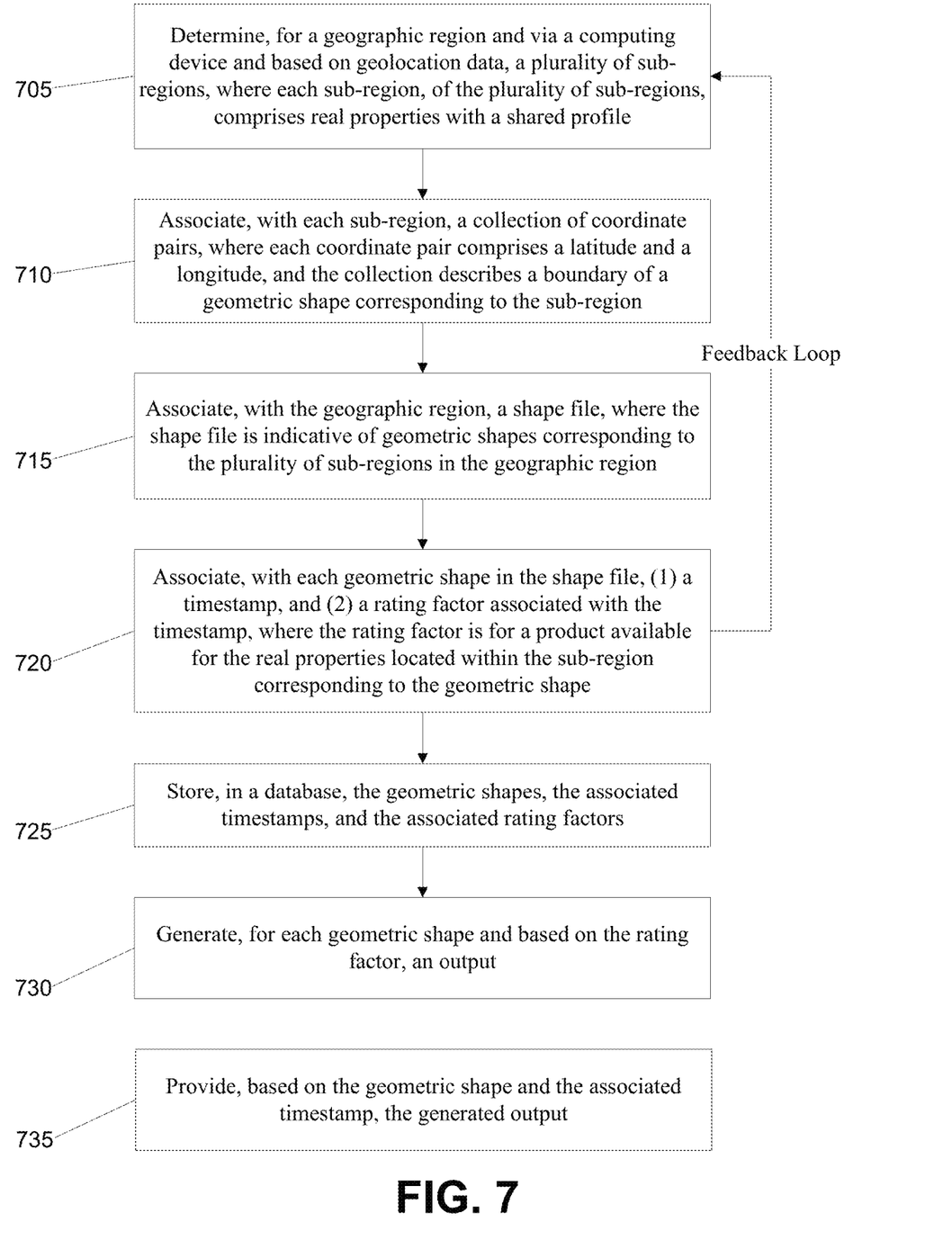
FIG. 7 illustrates another example method for determining geocoded region for rating systems in accordance with one or more aspects described herein.

FIG. 7 illustrates another example method for determining geocoded regions for rating systems in accordance with one or more aspects described herein.

At step 705, geocoded territory rating system 101 may determine, for a geographic region and via a computing device and based on geolocation data, a plurality of sub-regions, where each sub-region of the plurality of sub-regions comprises real properties with a shared profile.

At step 710, geocoded territory rating system 101 may associate, with each sub-region, a collection of coordinate pairs, where each coordinate pair comprises a latitude and a longitude, and the collection describes a boundary of a geometric shape corresponding to the sub-region.

At step 715, geocoded territory rating system 101 may associate, with the geographic region, a shape file, where the shape file is indicative of geometric shapes corresponding to the plurality of sub-regions in the geographic region.

At step 720, geocoded territory rating system 101 may associate, with each geometric shape in the shape file, (1) a timestamp, and (2) a rating factor associated with the timestamp, where the rating factor is for a product available for the real properties located within the sub-region corresponding to the geometric shape. In some embodiments, the process may return to step 705. For example, a change in the timestamp, and/or rating factor may cause geocoded territory rating system 101 to review the sub-regions, and/or modify the sub-regions.

At step 725, geocoded territory rating system 101 may store, in a database, the geometric shapes, the associated timestamps, and the associated rating factors.

At step 730, geocoded territory rating system 101 may generate, for each geometric shape and based on the rating factor, an output.

At step 735, geocoded territory rating system 101 may provide, based on the geometric shape and the associated timestamp, the generated output.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the invention.

What is claimed is:

1. A method comprising:
   training a machine learning model to determine a plurality of sub-regions using rating factors obtained for training;
   determining, for a geographic region and via a geocoding application of a geocoded territory rating system, the plurality of sub-regions using the trained machine learning model, wherein each sub-region of the plurality of sub-regions comprises real properties with a shared profile;
   associating, with each sub-region, a collection of coordinate pairs, wherein each coordinate pair comprises a latitude and a longitude, and the collection describes a boundary of a geometric shape corresponding to the sub-region, wherein determining each sub-region comprises determining a customized shape as the geometric shape using the trained machine learning model by identifying patterns associated with neighborhoods, and wherein the trained machine learning model is configured to output shape files including the geometric shapes, each shape file being associated with a different region profile;
   associating, with the geographic region, the geometric shapes corresponding to the plurality of sub-regions in the geographic region;
   associating, with each geometric shape in the shape file, a rating factor for the real properties located within the sub-region corresponding to the geometric shape;
   storing, in a database, the geometric shapes and the associated rating factors;
   generating, based on the rating factor and for the real properties located within the sub-region, an output; and
   providing, via the geocoded territory rating system and based on the geometric shape, the generated output.

2. The method of claim 1, further comprising:
   receiving, via the geocoded territory rating system, a request for an available recommendation associated with a property, wherein the request includes an address associated with the property;
   converting the address to address coordinates comprising a latitude and a longitude, wherein the address coordinates correspond to a geolocation of the property;
   matching, based on comparisons with the collections of coordinate pairs, the address coordinates with the geometric shape;
   retrieving, based on the geometric shape, the associated rating factor; and
   in response to the request, providing, via a graphical user interface and based on the rating factor, the generated output indicating the available recommendation.

3. The method of claim 1, further comprising:
   associating a timestamp with the geometric shape, and wherein the generated output is based on the timestamp.

4. The method of claim 1, further comprising:
   determining, for the geographic region, a second plurality of sub-regions;
   updating geometric shapes corresponding to the second plurality of sub-regions;
   updating the geometric shape;
   applying a second timestamp to the geometric shape; and
   updating the rating factors.

5. The method of claim 4, wherein the generated output is based on the second timestamp.

6. The method of claim 1, wherein the generated output comprises a recommendation for: a residential insurance product, a commercial insurance product, a vehicular insurance product, an insurance underwriting process, a marketing strategy, or a type of field deployment.

7. The method of claim 1, wherein at least one of the geometric shapes corresponds to a sub-region associated with a postal code.

8. The method of claim 1, wherein at least one of the geometric shapes corresponds to a sub-region associated with a rectangular grid based on geolocation data.

9. The method of claim 1, wherein the shared profile comprises at least one of a type of the real properties, a value of the real properties, a neighborhood crime rate, proximity to a body of water, proximity to a golf course, proximity to public transportation, location in a region prone to a natural disaster, position relative to a highway, or position relative to a mountain.

10. An apparatus, comprising:
a processor; and
a memory unit storing computer-executable instructions, which when executed by the processor, cause the apparatus to:
training a machine learning model to determine a plurality of sub-regions using a regional association of rating factors obtained for training;
determining, for a geographic region and via a geocoding application of a geocoded territory rating system, the plurality of sub-regions using the trained machine learning model, wherein each sub-region of the plurality of sub-regions comprises real properties with a shared profile;
associating, with each sub-region, a collection of coordinate pairs, wherein the collection describes a boundary of a geometric shape corresponding to the sub-region, wherein determining each sub-region comprises determining a customized shape as the geometric shape using the trained machine learning model by identifying patterns associated with neighborhoods, and wherein the trained machine learning model is configured to output shape files including the geometric shapes, each shape file being associated with a different region profile;
receive a request for a recommendation associated with a property, wherein the request includes an address associated with the property;
convert the address to address coordinates comprising a latitude and a longitude, wherein the address coordinates correspond to a geolocation of the property;
match the address coordinates with one of the geometric shapes corresponding to the plurality of sub-regions;
retrieve, based on the one of the geometric shapes, an associated rating factor; and
in response to the request, provide, via a graphical user interface and based on the rating factor, an indication of an available recommendation.

11. The apparatus of claim 10, wherein the instructions to match the address coordinates comprise additional computer-executable instructions, when executed by the processor, cause the apparatus to:
compare the address coordinates with the collection of coordinate pairs.

12. The apparatus of claim 10, wherein the computer-executable instructions, when executed by the processor, cause the apparatus to:
associate a timestamp with each of the geometric shapes, wherein the indication of the available recommendation is based on the timestamp.

13. The apparatus of claim 10, wherein the computer-executable instructions, when executed by the processor, cause the apparatus to:
update the one of the geometric shapes;
update the rating factor; and
associate a second timestamp with the geometric shape, wherein the indication of the available recommendation is based on the second timestamp.

14. The apparatus of claim 10, wherein the recommendation is for: a residential insurance product, a commercial insurance product, a vehicular insurance product, an insurance underwriting process, a marketing strategy, or a type of field deployment.

15. The apparatus of claim 10, wherein the shared profile comprises at least one of a type of the real properties, a value of the real properties, a neighborhood crime rate, proximity to a body of water, proximity to a golf course, proximity to public transportation, location in a region prone to a natural disaster, position relative to a highway, and position relative to a mountain.

16. One or more non-transitory computer-readable media storing instructions that, when executed by a geocoded territory rating system, cause the geocoded territory rating system to:
train a machine learning model to determine a plurality of sub-regions using rating factors obtained for training;
determine, for a geographic region and via a geocoding application of the geocoded territory rating system, the plurality of sub-regions using a trained machine learning model, wherein each sub-region of the plurality of sub-regions comprises real properties with a shared profile;
associate, with each sub-region, a collection of coordinate pairs, wherein each coordinate pair comprises a latitude and a longitude, and the collection describes a boundary of a geometric shape corresponding to the sub-region, wherein determining each sub-region comprises determining a customized shape as the geometric shape using the trained machine learning model by identifying patterns associated with the plurality of sub-regions, and wherein the trained machine learning model is configured to output shape files including the geometric shapes, each shape file being associated with a different region profile;
associate, with the geographic region, geometric shapes corresponding to the plurality of sub-regions in the geographic region;
associate, with each geometric shape, a timestamp, and a rating factor associated with the timestamp, wherein the rating factor is for a product available for the real properties located within the sub-region corresponding to the geometric shape;
store, in a database, the geometric shapes, the associated timestamps, and the associated rating factors;
generate, for each geometric shape and based on the rating factor, an output; and
provide, based on the associated timestamp, the generated output.

* * * * *